April 17, 1951     J. H. STEIN     2,548,918
VERTICAL INDICATOR
Filed Nov. 1, 1949
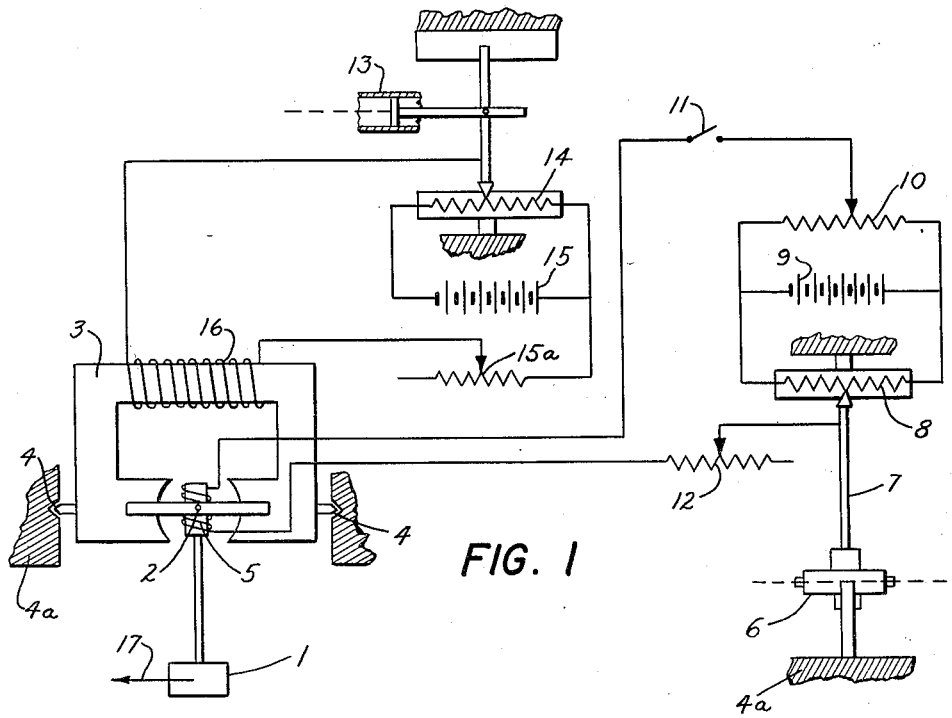
FIG. 1
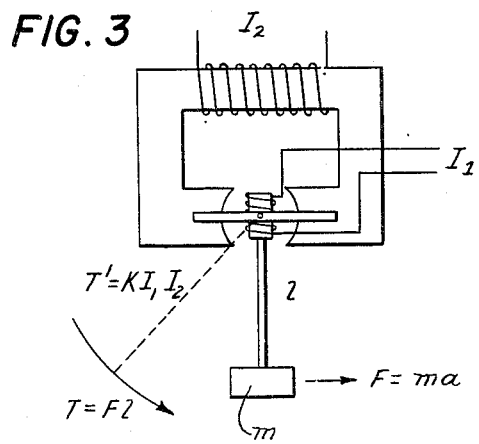
FIG. 2
FIG. 3
INVENTOR.
JAMES HENRY STEIN
BY
ATTORNEY Patented Apr. 17, 1951

2,548,918

UNITED STATES PATENT OFFICE 2,548,918

VERTICAL INDICATOR

James H. Stein, Toms River, N. J.

Application November 1, 1949, Serial No. 124,935

2 Claims. (Cl. 33—220)

(Granted under the act of March 3, 1883, as amended April 30, 1928; 370 O. G. 757)

Numerous devices for navigation, particularly those used in aircraft, depend for their operation upon the establishment of the direction of the vertical. This is accomplished by means of pendulous devices of various types. The gyroscopic horizon for aircraft is an example of such a device in which the alignment of a gyroscope is controlled by small pendulous or other gravity-actuated systems.

The indications of all pendulous devices are subject to deviations from the true vertical due to nonvertical accelerations that occur during changes in speed and during turns or other maneuvers.

One of the principal causes of such errors is the lateral acceleration produced during turns. The radial acceleration due to turning causes a lateral force on the center of gravity of the pendulum making the alignment of the pendulum deviate from the true vertical. This effect can be reduced by increasing the period of the pendulum as is done with gyroscopic artificial horizons. However, the error is still appreciable for certain precise purposes.

An object of the invention is to provide for a carrier a pendulous device affording an indication of the vertical that does not respond to accelerations produced by turns of the carrier.

Another object is to provide such a device in which a gyroscopic turn indicator is combined with an air-speed indicator to provide information whereby the magnitude of the radial acceleration on the pendulum can be measured and compensated.

Other objects and many of the attendant advantages of this invention will be readily appreciated as the same becomes better understood by reference to the following detailed description when considered in connection with the accompanying drawings wherein:

Fig. 1 is a diagrammatic view of a preferred form of the invention;

Fig. 2 is a view showing the lateral acceleration of an aircraft in turning; and Fig. 3 is a view showing the lateral force on the pendulum in turning.

In Fig. 1 the pendulum 1 is supported from and rotatable about bearings 2. Bearings 2 are attached to an electromagnet 3 of variable strength that is rotatable about a second set of bearings 4 attached to the mounting in an aircraft 4a, thereby forming a gimbal system for the pendulum. The axis of bearings 2 is oriented so as to be parallel to the longitudinal axis of the aircraft in level flight. A coil of wire, or armature, 5 is attached rigidly to the arm of the pendulum so that when current flows through the coil it tends to rotate between the poles of the magnet 3. A gyroscopic turn indicator 6 is provided to which is rigidly attached a movable arm 7 of a potentiometer 8. Potentiometer 8 is rigidly attached to the aircraft 4a. A source of electric current 9, such as a battery, is connected across the outer terminals of potentiometer 8. Shunting the current source is a balancing potentiometer 10, the arm of which is connected electrically through switch 11 to one terminal of coil 5. The other terminal of coil 5 is connected to the movable arm of the potentiometer. A calibration resistor 12 is inserted in this circuit to permit adjustment of the corrective force to the proper amount. An air-speed indicator 13 is arranged to actuate a potentiometer 14 so as to provide a current from a source 15 through field winding 16 of electromagnet 3, thereby causing the strength of the magnet to vary with the air speed of the aircraft. Source 15 can conveniently be the same as source 9, although this is not necessary. A calibration resistor 15a is inserted in this circuit to permit adjustment of the corrective force to the proper amount.

In operation during straight and level flight, pendulum 1 assumes a true vertical direction and no current is flowing through coil 5. The strength of the magnet 3 is proportional to the air speed of the aircraft. During a turn a lateral force 17 acts upon the center of gravity of pendulum 1 due to the angular acceleration caused by turning. Simultaneously the turn indicator changes from its zero position thereby moving the connecting arm 7 of the potentiometer 8 causing current to flow in coil 5 on pendulum 1. Also, a current that is proportional to the air speed flows in field winding 16. Consequently, the torque on armature 5 is proportional to the product of the rate of turn times the air speed. The relative polarity of the current flow in field winding 16 and armature 5 is made such that the coil tends to rotate in a direction opposite to that caused by the turn acceleration acting upon the mass of the pendulum. After the device is properly calibrated by adjustment of resistors 12 and 15a, the torque due to the product of the current in coil 5 times the current in field winding 16 exactly counteracts the torque due to the lateral acceleration of the mass of the pendulum so that the direction of the pendulum remains unchanged, giving an indication of the true vertical, regardless of the turning of the aircraft.

The compensating characteristic of the device is demonstrated mathematically by reference to Fig. 1 and Fig. 2. The terms used are defined as follows:

$a$ = lateral acceleration, directed along turning radius
$v$ = airspeed
$r$ = radius of turning
$w$ = angular velocity = $\frac{v}{r}$
$m$ = mass of pendulum
$F = ma$ = lateral force on pendulum due to turning
$l$ = effective length of pendulum
$I_1$ = armature current
$I_2$ = field current
$C_1 = \frac{I_1}{w}$ = calibration constant for turn indication
$C_2 = \frac{I_2}{v}$ = calibration constant for airspeed
$T = Fl = mal$ = torque about pendulum axis due to lateral acceleration
$T_1$ = compensating torque on pendulum
$K = \frac{T_1}{I_1 I_2}$ = conversion constant, giving relationship of $T_1$ to produce of currents To demonstrate that compensation can be effected, it must be shown that $T + T_1 = 0$, during any combination of air speed and rate of turn. This can be shown as follows:

$$T = Fl$$
$$= mal$$
$$T_1 = K(I_1 I_2)$$
$$= K(C_1 w)(C_2 v)$$
$$= K(C_1 C_2 wv)$$

Also, $$wv = \frac{v}{r} \times v = \frac{v^2}{r} = a$$

$$T_1 = KC_1 C_2 a$$
$$T = mal$$
$$T + T_1 = mal + KC_1 C_2 a$$
$$= a(ml + KC_1 C_2)$$
$$= 0 \text{ provided } KC_1 C_2 = -ml$$

Since $K$, $C_1$, $C_2$, $m$ and $l$ are all constants, this condition can be satisfied by adjusting the magnitude and polarity of $C_1$ and/or $C_2$, the calibration constants.

Obviously there are means other than electrical ones for applying the correcting forces to the pendulum. For example, methods using a magnetic drag or a friction clutch can be used. The essential requirement is that indications of the angular velocity of turning and the circumferential speed as given by suitable indicators be converted into an electrical or mechanical torque that is proportional to their product; and that such torque be applied to a pendulum in such a direction as to compensate for the torque resulting from the centrifugal force due to the turning. Also, while Fig. 1 shows the field magnet as being adjustable by means of a variable current applied through a field winding, the use of an electromagnet is not essential. For example, the magnetic field between the pole faces might be varied by means of a magnetic shunt, the position of which is controlled by the air speed. In fact, any method whereby torque is applied to the pendulum in proportion of the product of the speed and the angular rate of turn is within the scope of the invention. It is essential that the transfer system that applies the torque of the pendulum have negligible friction when no correction is being applied, in order that the pendulum be free to assume the vertical position regardless of any tilt of the mounting.

The drawing shows the apparatus whereby this correction can be applied to the inner gimbals of the pendulum. A similar correction could be applied to the outer gimbals by mounting the turn indicator so as to respond to vertical turning such as occurs during climbing, diving or looping of the aircraft.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

I claim:

1. A device comprising a carrier having a longitudinal axis, a pendulum mounted for rotation on said carrier about an axis parallel to said longitudinal axis when the latter is level, said pendulum normally occupying a vertical position, an armature member fixedly mounted on said pendulum, a winding on said armature member, a field-magnet member mounted for rotation on said carrier about an axis perpendicular to said pendulum axis, said armature being rotatable between the pole faces of the field magnet, a winding on said field magnet, first means for controlling the current strength in one of said windings in proportion to the speed of the carrier, and second means for controlling the current strength in the other of said windings in proportion to the rate of turn of the carrier.

2. A vertical-indicator device comprising a carrier having a longitudinal axis, a pendulum mounted for rotation on said carrier about an axis parallel to said longitudinal axis when the latter is level, said pendulum normally occupying a vertical position, an armature member fixedly mounted on said pendulum, a winding on said armature, a field-magnet member mounted for rotation on said carrier about an axis perpendicular to said pendulum axis, said armature being rotatable between the pole faces of the field magnet, a winding on said field magnet, said windings being connected to a source of constant-strength electric current, means for modulating the strength of current in one of said windings in proportion to the speed of the carrier, and means for modulating the strength of current in the other of said windings in proportion to the rate of turn of the carrier.

JAMES H. STEIN.

REFERENCES CITED

The following references are of record in the file of this patent:

UNITED STATES PATENTS

| Number | Name | Date |
|---|---|---|
| 2,205,228 | Smith | June 18, 1940 |
| 2,419,063 | Fischer | Apr. 15, 1947 |

FOREIGN PATENTS

| Number | Country | Date |
|---|---|---|
| 530,764 | Germany | 1931 |